Patented Oct. 28, 1952

2,615,861

UNITED STATES PATENT OFFICE 2,615,861

REACTING METHYL TRIACETOXY SILANE WITH POLYSILOXANE RESIN

Pierre Pascal Peyrot, La Begude, Feyzin, and Louis Jean Dumoulin, La Terrasse-sur-Dorlay, France, assignors to Societe des Usines Chimiques Rhone-Poulenc, Paris, France, a French body corporate No Drawing. Application August 9, 1948, Serial No. 43,348. In France March 10, 1948

12 Claims. (Cl. 260—46.5)

This invention relates to organosilicic resins and particularly to the production of improved resins of this type.

The organosilicic resins with which the present invention is concerned are polysiloxane resins which contain, per silicon atom, between 1 and 1.7 aliphatic, aromatic, arylaliphatic or cycloaliphatic radicals directly joined to the silicon atom. Aliphatic radicals may be e. g. methyl or ethyl, aromatic radicals may be e. g. phenyl, arylaliphatic radicals may be e. g. benzyl and cycloaliphatic radicals may be e. g. cyclohexyl. These organosilicic resins have been applied to widely different fields, such as electric insulation, water-proofing, coating, impregnation or agglomeration of the most varied materials.

It has been found that the addition of methyl triacetoxy silane to incompletely condensed organosilicic resins as defined above and the subsequent further condensation of the resins leads to an advantageous modification of the properties of the resins and of the final products obtained. Thus, if there are incorporated in an organosilicic resin, as hereinbefore defined, quantities of methyl triacetoxy silane equal to at least 7% of the weight of the resin, new compositions are obtained which have the advantage of being readily converted to dry products which are insoluble in organic solvents and which are harder, more adherent, more flexible and more brilliant than the products obtained under similar conditions from organosilicic resins alone. These advantages can arise simultaneously or separately according to the nature of the resin, the proportions of resin and of methyl triacetoxy silane, the conditions of application, the nature of the support to which the compositions may be applied and other factors. Compositions formed of the said organosilicic resins and methyl triacetoxy silane and containing more than 93% of resin have properties inclining towards those of the resins alone and do not have the properties characteristic of the products of this invention.

According to the present invention, therefore, a process for the production of an organosilicic resin of improved properties comprises admixing methyl triacetoxy silane with an incompletely condensed polysiloxane resin which contains, per silicon atom, 1 to 1.7 aliphatic aromatic arylaliphatic or cycloaliphatic radicals, the said methyl triacetoxy silane being between 7 and 90% by weight of the mixture, and thereafter continuing the condensation of the said resin the reaction being effected under substantially anhydrous conditions.

The organosilicic resins hereinbefore defined are, in general, miscible in all proportions with methyl triacetoxy silane. Mixtures thereof with methyl triacetoxy silane can be employed without solvent or in solution in solvents which are commonly employed for organosilicic resins, such for example as benzene, toluene, ethyl acetate, white spirit or mixtures thereof. Cyclohexanol, which can also be employed as solvent, exhibits the interesting property that it imparts particular flexibility to coatings prepared with mixtures of the said organosilicic resins and methyl triacetoxy silane.

Pigments, fillers or colouring agents of varied types, either alone or mixed, can be incorporated in the organosilicic resins employed in accordance with the present invention, provided only that these products be compatible with acetic acid. Examples are titanium dioxide, iron oxide and carbon black. To facilitate dispersion of the pigments in the resin solution, the pigments can be previously waterproofed, for example by treatment with a chlorsilane.

Compositions having a basis of organosilicic resin and methyl triacetoxy silane, obtained by the process of the present invention, can be employed for the most varied purposes, e. g. as adhesives for different materials like paper, cardboard and asbestos, as enamels for aluminum wire, as paints particularly to protect aluminium, and as waterproof coatings for reducing surface leakage, for protection against penetration of moisture and for preventing the harmful effects of salt water. The compositions can be used in the electrical and wireless industries, in which they act as good insulators, substantially proof against moisture. They can be applied to materials such as ceramics, glass, aluminium, iron plate, cardboard, coatings of synthetic resins, plastics such as cellulose acetate and superpolyamides.

The coating can be carried out by any suitable method, e. g. by brush, by immersion or by spraying. In general the compositions can be baked immediately after preparation, there being no necessity for any previous drying to prevent the inclusion of bubbles in the mass of the coating. Where necessary drying can frequently be effected merely by exposing the composition to the action of the air for some time before baking. According to the nature of these compositions and the use for which they are intended, it is necessary either to bake them at elevated temperatures or simply to leave them for several days at the temperature of the laboratory.

The following examples, in which the parts are by weight, serve to illustrate the invention but are not to be regarded as limiting it in any way.

Example I

To 100 parts of a 50% solution in ethyl acetate of a methylated polysiloxane resin, having a $CH_3:Si$ ratio in the neighbourhood of 1, are added 55 parts of methyl triacetoxy silane.

This solution, when spread on a strip of aluminium, and baked for 30 minutes at 100° C. for 45 minutes at 80° C., gives an adherent, colourless coating insoluble in toluene.

Starting from the same initial resin solution to which no methyl triacetoxy silane has been added, insolubilisation can only be obtained after heating for 16 hours at 100° C., and the coating is less adherent and less hard.

Example II 125 parts of titanium dioxide are dispersed in 250 parts of a 50% solution in ethyl acetate of a methylated polysiloxane resin, having a $CH_3:Si$ ratio in the neighbourhood of 1, and 50 parts of methyl triacetoxy silane are then added.

When spread on a strip of aluminium the product obtained gives, after baking for 1 hour at 80° C., a hard, brilliant white coating insoluble in toluene.

With the mixture of resin and titanium dioxide without methyl triacetoxy silane, a coating is obtained which is soluble in toluene and much less hard.

Example III

A dispersion of 62 parts of titanium dioxide in 250 parts of a 50% solution in ethyl acetate of a methylated polysiloxane resin, having a $CH_3:Si$ ratio in the neighbourhood of 1, is prepared.

20 parts of amyl acetate, 10 parts of cyclohexanol and 25 parts of methyl triacetoxy silane are added to 100 parts of this dispersion.

When applied to a glass plate and heated for 15 minutes at 80° C. and then further heated for 1½ hours at 105° C., the product obtained gives a very brilliant white enamel which is very adherent and very waterproof. Its angle of contact with water is 99° C., and the plate can remain immersed in water for several days without becoming wet.

On a strip of aluminium, the same product gives, after baking for 7 hours at 80° C., a very adherent, very flexible and very brilliant enamel. By heating only for 30 minutes at 80° C. and then again for 30 minutes at 160° C., a product is obtained which is very adherent, cannot be scored with the finger nail and is very brilliant and very flexible.

It may be noted that a mixture containing, with the exception of the methyl triacetoxy silane, the same quantities of the same starting materials gives, when baked for the same period and at the same temperature, coatings which are less brilliant, adhere much less strongly to the support, are readily scored with the finger nail and are much less flexible.

Example IV 1 part of a composition identical to that described in Example III, is diluted with 1 part of ethyl acetate and a coating of this composition is sprayed onto a sheet of superpolyamide.

After baking for 30 minutes at 110° C., there is obtained a white, waterproof, extremely adherent coating, while a coating prepared under the same conditions in the absence of methyl triacetoxy silane adheres very badly.

Example V

A glass-covered electric conductor wire is coated by immersion with a composition identical to that described in Example III and baked for 30 minutes at 105° C. The insulating coating obtained, after immersion in distilled water for 24 hours, has an insulation resistance of $1.6 \times 10^8$ ohms per 15 cm. length, while an identical uncoated comparative wire has an insulation resistance of only $3.3 \times 10^5$ ohms. After exposure to air for 20 minutes, the untreated wire and the treated wire give insulation resistances of $5 \times 10^6$ ohms and more than $10^{10}$ ohms respectively.

Example VI 125 parts of titanium dioxide are dispersed in 250 parts of a 50% solution in ethyl acetate of a methylated polysiloxane resin, having a $CH_3:Si$ ratio in the neighbourhood of 1.

2.5 parts of methyl triacetoxy silane are added per 5 parts of the resin-ethyl acetate solution and the composition is coated on aluminium.

After 48 hours at room temperature, a white, hard, insoluble coating is obtained.

A mixture of the same ingredients without methyl triacetoxy silane gives after 48 hours a coating which is very soluble in organic solvents.

Example VII 40 parts of methyl triacetoxy silane are added to 100 parts of a 50% solution in a mixture of benzene and ethyl acetate, of a methylated polysiloxane resin, having a $CH_3:Si$ ratio in the neighbourhood of 1.25. When spread on a strip of aluminium and baked for 30 minutes at 150° C. the product obtained is dry and insoluble.

When obtained from the same initial resin solution without any addition of methyl triacetoxy silane, the product does not become insoluble until it has been heated for 2 hours at 150° C.

Example VIII 5 parts of methyl triacetoxy silane are added to 100 parts of a 50% solution in benzene of a methylated polysiloxane resin, having a $CH_3:Si$ ratio of 1.5. When spread on a strip of aluminium and heated for 1 hour at 200° C., the product is dry and insoluble in toluene, this solvent producing only a slight swelling of the coating.

When the same resin solution without any addition of methyl triacetoxy silane is employed, the coating obtained is sticky and soluble in toluene, even after baking for 4 hours at 200° C.

Example IX 42 parts of methyl triacetoxy silane are added to 100 parts of a 70% solution in benzene of polysiloxane resin having a $CH_3:Si$ ratio equal to 1.5. The mixture is coated on an aluminium support and heated for 15 minutes at 80° C. and then for 2 hours at 200° C. A dry product is obtained, which is adherent, flexible and insoluble in toluene.

The comparative resin not containing the methyl triacetoxy silane, when treated under the same conditions, is still sticky and soluble in toluene.

Example X 25 parts of methyl triacetoxy silane and 20 parts of toluene are added to 100 parts of a polysiloxane resin having a C₂H₅:Si ratio equal to 1.5. This composition is spread on a strip of aluminium, which is heated for 15 minutes at 80° C., and then for 1 hour at 150° C. A dry, flexible, adherent coating is obtained which is insoluble in toluene.

The comparative resin, not containing the methyl triacetoxy silane, when heated under the same conditions is sticky and very soluble in toluene.

*Example XI*

100 parts of a resin similar to that employed in Example X, are mixed with 80 parts of methyl triacetoxy silane.

The composition obtained, when applied to a support and heated for 15 minutes at 80° C. and then for 1 hour at 150° C. gives a dry adherent and flexible coating.

*Example XII*

40 parts of methyl triacetoxy silane and 50 parts of toluene are added to 100 parts of a polysiloxane resin having a C₆H₅CH₂:Si ratio equal to 1.5. When spread on a strip of aluminium, this composition dries after heating for 30 minutes at 80° C., followed by heating for 1 hour 30 minutes at 200° C. From the same initial resin solution to which no methyl triacetoxy silane is added, a coating is obtained which is still sticky after the same heat treatment.

We claim:

1. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxysilane being between 7 and 90% by weight of the mixture, and thereafter continuing the condensation of the said resin, the reaction being effected under substantial anhydrous conditions.

2. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, and thereafter subjecting the said mixture to a heat treatment, the reaction being effected under substantial anhydrous conditions.

3. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, and thereafter subjecting the said mixture to a heat treatment at a temperature of at least 80° C., the reaction being effected under substantial anhydrous conditions.

4. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, and thereafter continuing the condensation of the said resin by allowing it to stand at room temperature, the reaction being effected under substantial anhydrous conditions.

5. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, applying said mixture as a coating on a support surface and thereafter subjecting the said mixture to a heat treatment, the reaction being effected under substantial anhydrous conditions.

6. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, applying said mixture as a coating on a support surface and thereafter subjecting the said mixture to a heat treatment at a temperature of at least 80° C., the reaction being effected under substantial anhydrous conditions.

7. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, applying said mixture as a coating on an aluminum support and thereafter subjecting the said mixture to a theat treatment, the reaction being effected under substantial an hydrous conditions.

8. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, in the presence of a solvent for the mixture and thereafter subjecting the said mixture to a heat treatment, the reaction being effected under substantial anhydrous conditions.

9. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, in the presence of a solvent for the mixture and thereafter subjecting the said mixture to a heat treatment at a temperature of at least 80° C., the reaction being effected under substantial anhydrous conditions.

10. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, in the presence of ethyl acetate as solvent and thereafter subjecting the said mixture to a heat treatment, the reaction being effected under substantial anhydrous conditions.

11. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, in the presence of ethyl acetate as solvent and thereafter subjecting the said mixture to a heat treatment at a temperature of at least 80° C., the reaction being effected under substantial anhydrous conditions.

12. A process for the production of a polysiloxane resin of improved properties which comprises admixing methyl triacetoxy silane with an incompletely condensed polysiloxane resin which contains, per silicon atom, 1 to 1.7 organic radicals selected from the class consisting of alkyl and aralkyl radicals, the said methyl triacetoxy silane being between 7 and 90% by weight of the mixture, in the presence of a solvent mixture including cyclohexanol and thereafter subjecting the said mixture to a heat treatment, the reaction being effected under substantial anhydrous conditions.

PIERRE PASCAL PEYROT.
LOUIS JEAN DUMOULIN.

REFERENCES CITED

The following references are of record in the file of this patent:

UNITED STATES PATENTS

| Number | Name | Date |
|---|---|---|
| 2,386,793 | Hanford | Oct. 16, 1945 |
| 2,397,727 | Daudt | Apr. 2, 1946 |
| 2,397,895 | Warrick | Apr. 2, 1946 |
| 2,486,162 | Hyde | Oct. 25, 1949 |
| 2,501,525 | Krieble et al. | Mar. 21, 1950 |
| 2,537,073 | MacKenzie et al. | Jan. 9, 1951 |

OTHER REFERENCES

Chemical & Eng. News, vol 24, No. 9, May 10, 1946, pp. 1233 and 1234.

Schuyten et al. Journ. Amer. Chem. Soc. vol. 69, Sept. 1947, pp. 2110 to 2112.